Patented Apr. 6, 1943

2,315,765

UNITED STATES PATENT OFFICE 2,315,765

PROCESS FOR THE MANUFACTURE OF QUATERNARY ACYLCYANOGUANIDINES

Jakob Bindler, Basel, Switzerland, assignor to the firm of J. R. Geigy A. G., Basel, Switzerland No Drawing. Application March 25, 1941, Serial No. 385,207. In Switzerland May 8, 1940

6 Claims. (Cl. 260—401)

It has been found that valuable quaternary acylcyanoguanidine compounds are obtained by alkylating or aralykylating exhaustively, that is up to water-solubility, acylcyanoguanidines which contain the acyl radical of a carboxylic acid with 12 to 18 C-atoms and which may correspond to the formula

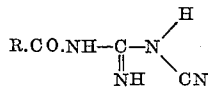

wherein R.CO is the radical of a carboxylic acid with 12 to 18 carbon atoms.

The high molecular acylcyanoguanidines can be made according to usual methods; for example, it is advantageous to start from dicyanodiamide, and to acylate the latter with the carboxylic acids coming into question or with reactive derivatives thereof. The preparation thus described is per se no part of the present invention, which is concerned with the alkylation or aralkylation of the resultant acyl compounds and with the products of such alkylation or aralkylation. As intermediate products there may be prepared the tertiary compounds which are then converted into water-soluble form by means of the usual alkylating or aralkylating agents such as dimethyl sulfate, diethyl sulfate, benzyl chloride and so on.

The new compounds are especially useful as textile assistants, for example as wetting agents, softening agents for textiles and the like.

The following examples illustrate the present invention, the parts being by weight unless otherwise stated.

Example 1

36.5 parts of a methylated stearoylcyanoguanidine, obtained by the reaction of 175 parts of stearoylcyanoguanidine of the formula

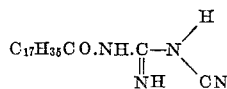

in 600 parts of chlorobenzene with 126 parts of dimethyl sulfate and 106 parts of sodium carbonate, are heated with 14.5 parts of dimethyl sulfate for ½–¾ hour to 90–95° C. The exhaustively methylated product is clearly soluble in water and is very suitable for use as softening agent for cellulose fibers.

By using partly or wholly diethyl sulfate instead of dimethyl sulfate one obtains the same final products.

Example 2

29 parts of a methylated product, obtained from 42 parts of lauroylcyanoguanidine of the formula

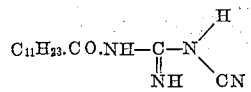

19 parts of dimethyl sulfate and 16 parts of sodium carbonate in chlorobenzene, are heated overnight with 13 parts of benzyl chloride to 120° C. The whole is then poured into water, freed from insoluble matter by extraction with ether and the aqueous solution evaporated. A brown wax-like mass remains behind.

There may, however, also be proceeded in the reverse manner by first benzylating and then methylating the benzyl-lauroylcyanoguanidine for example with $CH_3Br$ or $CH_3I$.

Compounds with substituted benzyl radicals, such as the p-chlorobenzyl compounds, possess similar properties.

Example 3

31 parts of an ethyl-lauroylcyanoguanidine obtained by ethylating 42 parts of lauroylcyanoguanidine with 23 parts of diethyl sulfate in presence of chlorobenzene and sodium carbonate, are heated with 18 parts of diethyl sulfate for 3–4 hours to 95° C. The quaternary compound is clearly soluble in water and is a remarkable softener for textiles.

The corresponding compounds made with dimethyl sulfate or from methyllauroylcyanoguanidine with dimethyl- or diethyl sulfate possess the same properties.

Example 4

36 parts of the methylated stearoylcyanoguanidine used in Example 1 are heated with 17 parts of bromacetic acid ester for 12 hours to 130° C. The whole is then poured into water, if necessary extracted with petroleum ether, and the residue is evaporated. The new compound is obtained in the form of a brown wax-like paste.

The expression "lauroyl radical" means the radical of the technical fatty acid mixture such as it is obtained by saponifying palm nut fat, while "stearoyl" means mainly the radical of the technical stearic acid containing palmitic acid. Other fatty acids and fatty acid mixtures which mainly contain compounds with 12 to 18 C-atoms come also into consideration, thus for example fish-oil fatty acid, cotton-seed oil fatty acid, oleic acid and the like.

What I claim is:

1. A process for the manufacture of water soluble quaternary acylcyanoguanidines, comprising causing an acylcyanoguanidine of the general formula

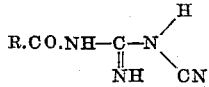

wherein R.CO means the radical of a carboxylic acid with 12 to 18 carbon atoms to react exhaustively with at least one member of the group consisting of alkylating and aralkylating agents.

2. A process for the manufacture of water soluble quaternary acylcyanoguanidines, comprising causing lauroylcyanoguanidine of the formula

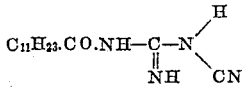

to react exhaustively with at least one member of the group consisting of alkylating and aralkylating agents.

3. A process for the manufacture of water soluble quaternary acylcyanoguanidines, comprising causing stearoylcyanoguanidine of the formula

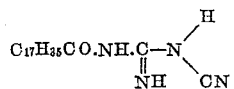

to react exhaustively with at least one member of the group consisting of alkylating and aralkylating agents.

4. A process for the manufacture of a water soluble quaternary acylcyanoguanidine, comprising permethylating stearoylcyanoguanidine with dimethyl sulfate.

5. A process for the manufacture of a water soluble quaternary acylcyanoguanidine, comprising methylating lauroylcyanoguanidine up to the tertiary degree with dimethyl sulfate and causing this compound to react with benzyl chloride to form the quaternary compound.

6. A process for the manufacture of a water soluble quaternary acylcyanoguanidine, comprising perethylating lauroylcyanoguanidine with diethyl sulfate.

JAKOB BINDLER.